(12) United States Patent
Chand et al.

(10) Patent No.: US 6,763,193 B1
(45) Date of Patent: Jul. 13, 2004

(54) OPTICAL COMMUNICATION SYSTEM OPTICALLY COMBINING BOTH BASEBAND AND PASSBAND SIGNALS

(75) Inventors: Naresh Chand, Berkeley Heights, NJ (US); Thomas Henry Daugherty, Succasunna, NJ (US); Wouterus Muys, Bunschoten (NL); Yong-Kwan Park, Wescosvilole, PA (US); Venkataraman Swaminathan, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,823

(22) Filed: Nov. 29, 1999

Related U.S. Application Data
(60) Provisional application No. 60/147,666, filed on Aug. 6, 1999, and provisional application No. 60/112,480, filed on Dec. 16, 1998.

(51) Int. Cl.[7] .............................................. H04J 14/00
(52) U.S. Cl. ......................... 398/76; 398/91; 398/183; 375/261
(58) Field of Search .............................. 359/133, 124, 359/125; 398/91, 74, 76, 183, 185, 186, 189; 375/261, 298

(56) References Cited

U.S. PATENT DOCUMENTS

| | | | | |
|---|---|---|---|---|
| 5,500,758 A | * | 3/1996 | Thompson et al. | 359/133 |
| 5,596,436 A | * | 1/1997 | Sargis et al. | 358/443 |
| 5,825,518 A | * | 10/1998 | Maeda et al. | 359/124 |
| 5,850,303 A | * | 12/1998 | Yamamoto et al. | 359/133 |
| 5,880,865 A | * | 3/1999 | Lu et al. | 359/125 |
| 6,323,973 B1 | * | 11/2001 | Hongou | 359/110 |
| 6,362,903 B1 | | 3/2002 | Spickermann et al. | 359/124 |

FOREIGN PATENT DOCUMENTS

| | | |
|---|---|---|
| GB | 2 289 812 A | 11/1995 |
| WO | WO 96/10303 | 4/1996 |

OTHER PUBLICATIONS

Feldman, R.D. et al.: "Broadband Upgrade of an Operating Narrowband and Single–Fiber Passive Optical Network Using Coardse Wavelength Division Multiplexing and Sub–carrier Multiple Access", Journal of Lightwave Technology, IEEE. New York, US, vol. 16, No. 1, 1998, pp. 1–8.

Ovadia, S. et al.: "Hybrid AM/QAM Video Lightwave Systems: Performance of Different Laser Transmitters in the Presence of Optical Reflections", Communications—Gateway to Globalization. Preceedings of the International Conference on Communications. Seattle. Jun. 18–22, 1995, Preceedings of the International Conference on Communications (ICC), New York, IEEE, US, vol. 1, Jun. 18, 1995, pp. 591–595.

* cited by examiner

*Primary Examiner*—Leslie Pascal
*Assistant Examiner*—Christina Y Leung

(57) ABSTRACT

This invention is a new communication system in which multichannel broadcast digital services are distributed to each user with the broadcast services signal riding in the passband above a digital baseband signal. The system can deliver more than 1 Gbps additional bandwidth to each subscriber. The passband bandwidth will accommodate growth in downstream services including video on demand, higher speed web downloads including improved streaming audio and video, HDTV, interactive video, and personalized video. The invention requires only a single fiber path and a single optical receiver for each user or group of users. A single fiber, single optical receiver system is much less expensive than two systems, one transmitting baseband and the other passband. A single receiver is greatly cost beneficial to achieving economical fiber to the home.

24 Claims, 9 Drawing Sheets

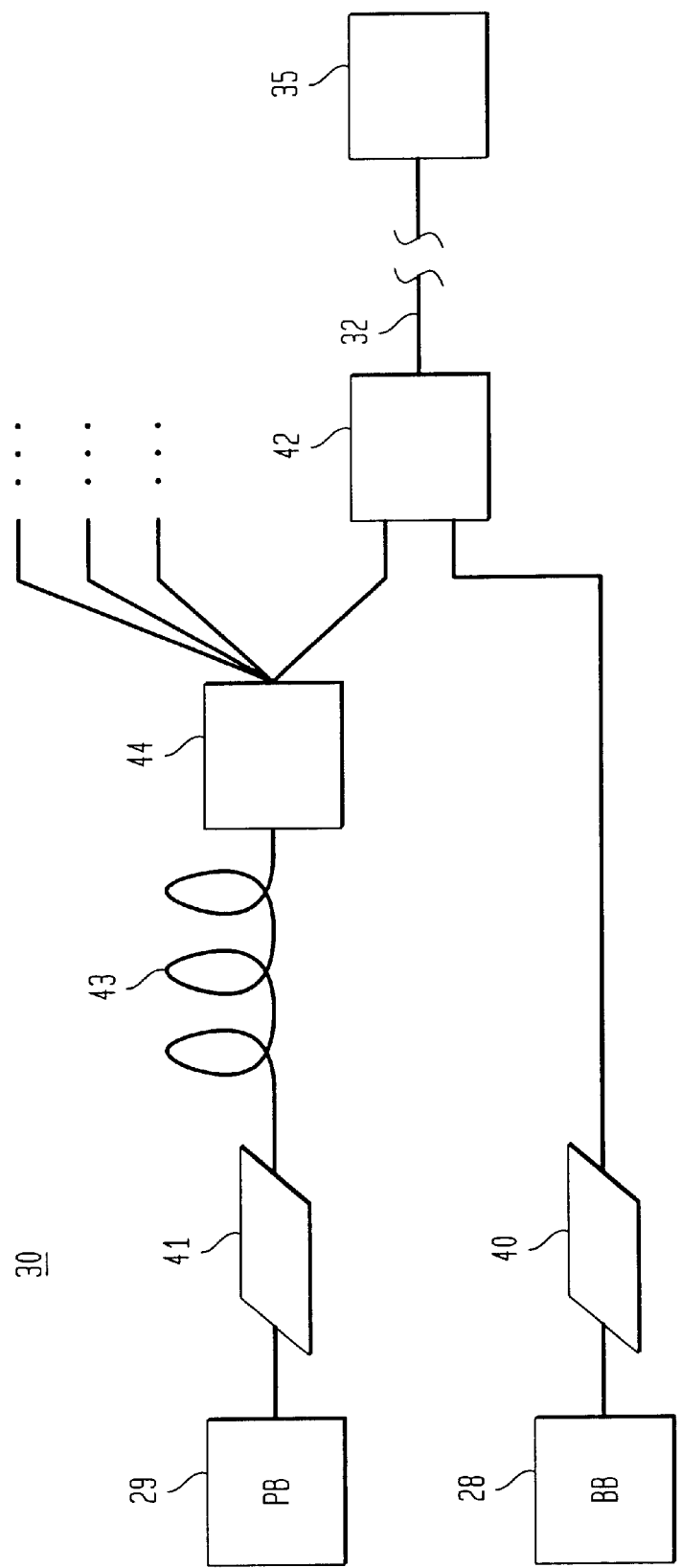

OPTICAL COMMUNICATION SYSTEM OPTICALLY COMBINING BOTH BASEBAND AND PASSBAND SIGNALS

CROSS REFERENCE TO RELATED APPLICATIONS

This application claims the benefit of U.S. Provisional application Serial No. 60/112,480 filed by the present applicants on Dec. 16, 1998 and U.S. Provisional Application Serial No. 60/147,666 filed by the present applicants on Aug. 6, 1999.

FIELD OF THE INVENTION

This invention relates to optical communication systems and, in particular, to an optical communication system which optically combines baseband signals and passband signals and transmits the combined signals over a common optical fiber.

BACKGROUND OF THE INVENTION

An ever increasing communication need of today is to deliver multimedia services such as voice, data, high speed internet access, video conferencing, video on demand, and broadcast television video to small businesses and residences. Cost is the prominent issue for the deployment of such networks. Among various technologies that are currently available and being deployed, optical fiber extending to users—Fiber to the Home (FTTH)—is the preferred technology to meet present and future needs. Service providers are taking fiber as deep into their networks as their costs allow.

Two different optical fiber communication systems have evolved for carrying information in digital formats to homes and businesses. One system delivers information by a digitally modulated series of light pulses. These are referred to as baseband signals. A second system uses a plurality of frequency separated carriers. Each carrier is modulated to transmit a digital signal. These are passband signals. Each system has its own specialized equipment, its own physical plant and its own standards.

FIG. 1A schematically illustrates a baseband system 10 comprising a central office 11 providing optical fiber connections to a plurality of homes 12 and businesses 13. High power optical signals at single or multiple wavelengths are transmitted over a plurality of access fibers 15A, 15B, 15C to respective optical power splitters and/or wavelength demultiplexers 16A, 16B, 16C, and at each power splitter or demultiplexer, e.g., 16B, the high power signal is divided into a plurality of lower power or separate wavelength signals and transmitted over a respective plurality of end user fibers 17A and 17B. These signals are called downstream signals. The downstream signals are typically a digitally modulated baseband series of light pulses centered in the 1.3–1.6 μm wavelength band. Signals from the end users to the central office, called upstream signals, are typically digitally modulated baseband pulses in the same 1.3–1.6 wavelength band but at different wavelength from the downstream wavelength. They are transmitted in the reverse direction over the same fibers. The upstream signals can be buffered and time division multiplexed for burst transmission at the power splitters, e.g., 16B. Since this system does not employ any active electronic or photonic component between the central office and the users, it is called a Passive Optical Network (PON).

FIG. 1B illustrates a simplified baseband modulation scheme. Typically, a digital 1 is represented by a light pulse in the series. A digital 0, by the absence of a pulse in a pulse position. Alternatively, the signal can be inverted with a pulse representing digital 0 and its absence representing 1.

FIG. 2A schematically illustrates a passband system 20 comprising a hub 21, and a plurality of fibers 22A, 22B, 22C connecting the hub to a respective plurality of fiber nodes 23A, 23B and 23C. Each node is connected, as by a plurality of fibers or coaxial cables 24A and 24B to a plurality of homes 12 and businesses 13.

FIG. 2B illustrates the radio frequency spectrum of a typical digitally modulated passband signal. The signal comprises a plurality of different radio frequency (RF) carriers spaced apart in frequency (e.g. 6 MHz spacing in the NTSC system). Each of the carriers is modulated among a plurality of states to carry a higher order digital signal to encode plural bits for each modulation state. The modulation can be amplitude modulation, frequency modulation, phase modulation or a combination of them.

Digital passband signals are conventionally transmitted using two RF carriers that are frequency locked but 90 degrees out of phase. The two carriers are said to be in quadrature. The two carriers are separately amplitude modulated (AM), and the modulated carriers are combined to form a single RF output having both amplitude information corresponding to their vector sum and phase information corresponding to their vector angle. The technique is known as quadrature amplitude modulation or QAM.

FIG. 2C illustrates the simplest case of QAM which occurs when each of the carriers has only two states (e.g. +V and −V). One carrier, is considered the reference carrier and is called the in-phase channel. Its amplitude is represented along the horizontal axis of FIG. 2(C). The other carrier, 90° out of phase, is called the quadrature channel. Its amplitude is represented along the vertical axis. As can be seen from the diagram, if each carrier has two states (+V, −V), then there are four possible combined outputs, each of which can represent two bits of information: (0,0), (0,1), (1,0), (1,1). This simple modulation scheme is known as quadrature phase shift keying (QPSK).

Similar modulation schemes can be based on amplitude modulation of the carriers among a larger number of states. For example if both carriers can be modulated among four amplitudes, the combined output can represent 4×4=16 states, and the modulation is called 16 QAM modulation. Modulation using 8×8=64 states is 64 QAM. With an increasing number of modulation states, the required signal-to-noise ratio also increases.

In the past few years there has been an international effort from service providers and system manufacturers to define common specifications aimed at the extension of fiber all the way to homes and businesses to deliver existing and future services. These specifications are now part of International Telecommunication Union (ITU) standard G.983.1

According to G.983.1, all services are transported in baseband format in both the upstream and downstream directions on a power splitter-based system. In one variant of the network, a shared 155-Mbps baseband signal is transported downstream in the 1.5-μm band and the same bit rate is sent upstream in the 1.3-μm band on a single fiber. For low cost, a single transmitter in the central office and a single fiber can serve up to 32 users if the fiber is all the way to the user's premises. The number of users can even be greater if the receiver is at the curb and electrical signals are distributed to multiple dwellings. The G.983.1 specification calls for a minimum logical reach of at least 20 km and an optical power budget consistent with that reach. The specified downstream receiver sensitivity at a bit error ratio of <10$^{10}$ is −30 dBm for Class B operation and −33 dBm for Class C.

A downstream capacity of 155 Mbps shared among 32 end users is more than adequate for interactive services such as voice, data, or interactive video, but can be quickly exhausted by multichannel broadcast video, especially if high definition TV (HDTV) is to be delivered. One approach to dealing with broadcast video delivery in G983.1 is to increase the downstream bandwidth from 155 to 622 Mbps. This approach is very expensive and complicates video channel switching. Alternatively, video signals can be delivered on a separate fiber using a separate transmitter and a separate receiver. This approach is even more expensive. Accordingly, there is a need for a new approach which improves the performance and lowers the cost.

An optical communication system for gracefully combining both baseband and passband signals on a common fiber is described in applicant's U.S. patent application Ser. No. 09/432,936 filed Nov. 3, 1999 and entitled "Optical Communication System Combining Both Baseband and Passband Signals", which is incorporated herein by reference. In this system, the baseband and passband signals are electrically combined, and the combined signal modulates an optical output signal at the Central office. The optical signal can be sent over an optical fiber to a remote power splitter where it is passively power split among a plurality of fibers to respective end users. Within the power budgets of ITU-T G.983.1, this architecture can support the QPSK modulation format that satellite TV uses for class B operation with a PIN diode receiver or class C operation with an APD receiver. For terrestrial transmission of broadcast digital services, most service provider's, such as providers of cable TV, or wireless cable TV (MMDS services), use 64 QAM or higher order modulation. Compared to QPSK, delivery of 64 QAM modulated signal requires about 13 dB more signal to noise ratio in the electrical domain which means 6.5 dBm more optical power at the receiver. Alternatively, the receiver should be at least 6.5 dB more sensitive. Experimental data show that to deliver a 64 QAM modulated passband signal on top of a 155 Mbps baseband signal in class B of G.983.1, an APD based receiver is required. An APD is much more expensive than a PIN diode. The APD operation requires a supply of typically more than 50V with much more complex voltage and temperature stabilization circuitry as compared to a PIN diode that requires less than 5V and much simpler circuitry.

Telecommunication and Cable TV service providers would prefer to use 64 QAM or higher order modulation for broadcast digital services to make use of their existing video infrastructure and to use the bandwidth efficiency of 64 QAM that can deliver up to 6 bits per Hertz as opposed to a maximum of 2 bits per Hertz by QPSK. To deliver 6.5 dBm more optical power for 64 QAM and to remain within the power budgets of ITU-T G983.1 for the baseband signal, there is a need for a different architecture (system) that can combine baseband and passband signals with an even higher level of performance.

SUMMARY OF THE INVENTION

This invention is a new communication system in which multichannel broadcast digital services are distributed to each user with the broadcast services signal riding in the passband above a digital baseband signal. The system can deliver more than 1 Gbps additional bandwidth to each subscriber. The passband bandwidth will accommodate growth in downstream services including video on demand, higher speed web downloads including improved streaming audio and video, HDTV, interactive video, and personalized video. The invention requires only a single fiber path and a single optical receiver for each user or group of users. A single fiber, single optical receiver system is much less expensive than two systems, one transmitting baseband and the other passband. A single receiver is greatly cost beneficial to achieving economical fiber to the home.

Although the result of the invention is to add digital video and other bandwidth demanding services on the system described in G983.1, it can also be used in other architectures where specifications or requirements differ from G983.1. For example, upstream or downstream data rate and optical wavelengths and the required receiver sensitivity and bit error rates may vary according to the specific application. The invention can also be used in point to point transmission of baseband and passband signals on a single fiber and receiver. Furthermore, the optical receiver or ONT does not have to be at the customer premises. It can be outside on the curb. From the curb, the baseband and passband services can be delivered to subscribers sharing that ONT on twisted copper wires or coaxial cables, in an architecture popularly known as Fiber to the Curb (FTTC). For twisted copper wires, the services can be delivered using any of the conventional digital subscriber line techniques. For coaxial lines, hybrid fiber-coaxial (HFC) technology is used.

In an exemplary embodiment, an optical communication system comprises a first optical transmitter for generating an optical baseband signal, a second optical transmitter for generating an optical passband signal, an optical power coupler for combining the signals, a length of optical transmission fiber for transmitting the combined optical signal, and one or more receivers optically coupled to the fiber. In an advantageous system, an optical power splitter is optically coupled to the transmission fiber for power splitting the transmitted signal among a plurality of end-user fibers, and, for each user or group of users, an optical receiver is coupled to the user fiber.

BRIEF DESCRIPTION OF THE DRAWINGS

The advantages, nature and various additional features of the invention will appear more fully upon consideration of the illustrative embodiments described in connection with the accompanying drawings. In the drawings:

FIG. 3 is a schematic block diagram of an exemplary optical communication system combining both baseband and passband signals;

It is to be understood that these drawings are for purposes of illustrating the concepts of the invention and, except for the graphs, are not to scale.

DETAILED DESCRIPTION

Figure 1A:
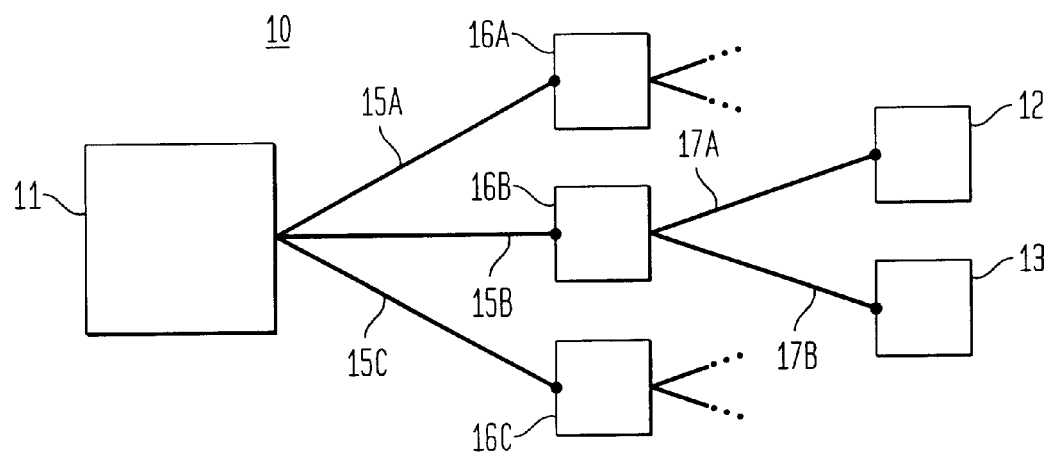
FIGS. 1A and 1B illustrate features of a typical baseband communication system.
Figure 1B:
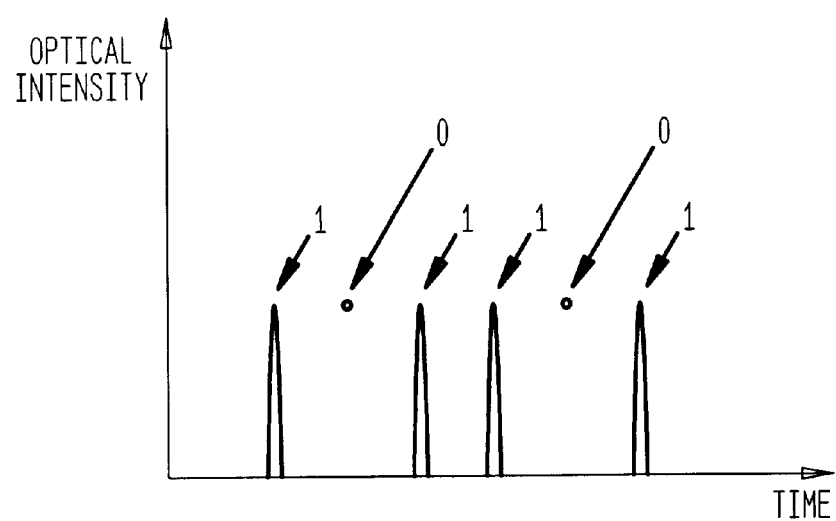
Figure 2A:
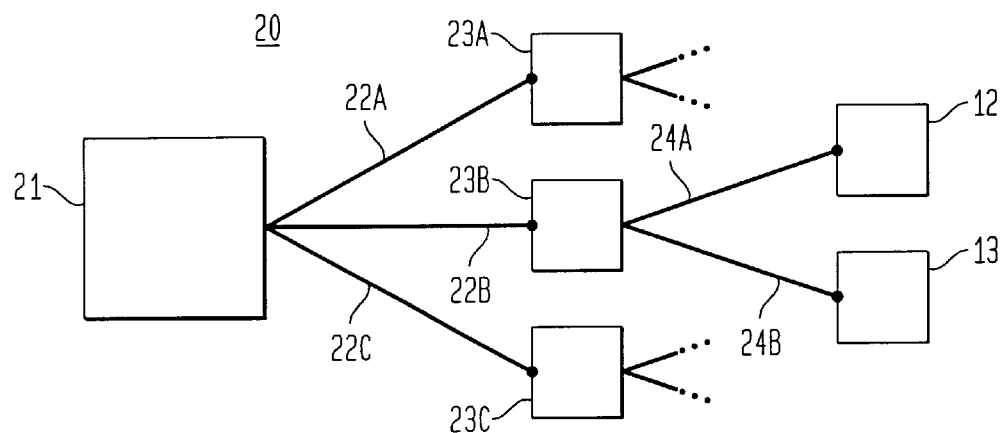
FIGS. 2A, 2B and 2C illustrate features of a typical passband communication system.
Figure 2B:
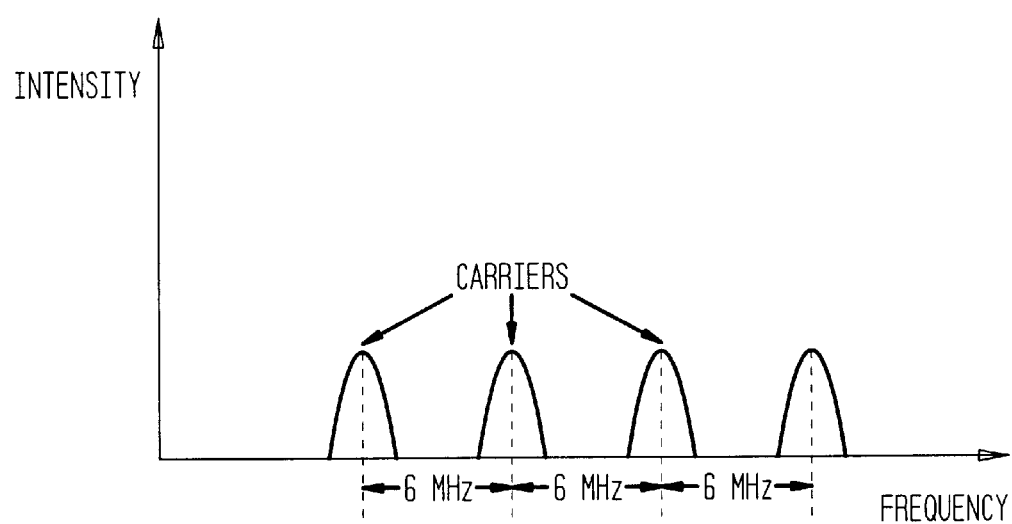
Figure 2C:
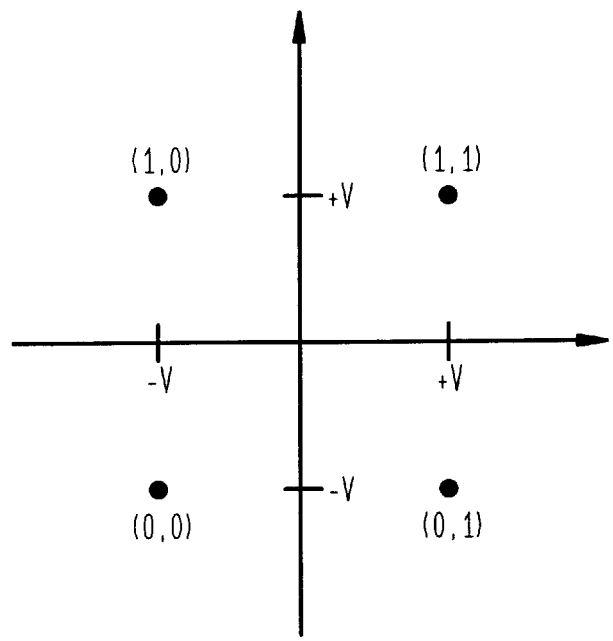

FIGS. 1 and 2, which relate to conventional baseband and conventional passband systems were described in the Background of the Invention.

FIG. 3 is a schematic block diagram of an optical communication system 30 for combining both baseband signals and passband signals on one or more common optical transmission fibers 32. In essence, the system 30 comprises a first optical transmitter 40 responsive to an input electrical baseband signal from a baseband source 28 and a second optical transmitter 41 responsive to an input electrical passband signal from a passband source 29. Transmitter 40 can be a digital transmitter (e.g. directly modulated digital laser) digital laser, and transmitter 41 can be an analog transmitter (e.g. an analog laser or an externally modulated digital laser). The transmitters 40, 41 separately generate optical signals containing the information of their respective input signals. The optical signals are then optically combined in an optical combiner such as an optical power coupler 42, and the combined optical signal is transmitted to one or more optical receivers 35. At least one optical receiver 35 can detect and demodulate both the baseband signal and the passband signal. It is contemplated that the transmitters 40,41 will be located at a central office. It is also possible that the electrical to optical conversion of the passband signal may occur deeper in the network, presenting an optical passband signal at the central office.

In the preferred arrangement shown in FIG. 3 the passband signal comprises broadcast digital signals that will be virtually the same for all users whereas the baseband signal is dedicated to a particular group of users. Accordingly, it may be advantageous to amplify the optical passband signal in an erbium doped fiber amplifier (EDFA) 43 and apply the amplified output to an optical power splitter 44. This provides plural optical passband signals that can be combined with other dedicated baseband signals for other groups of users (not shown).

In one embodiment, the baseband signal is a digitally modulated time division multiplexed (TDM) 155 Mbps baseband signal conforming to the power budgets and other specifications of the ITU industry standard G983.1. The passband signal is a quadrature phase-shift keying frequency division multiplexed (FDM) signal carrying greater than 1 Gbps of information. The baseband and passband signals are converted by transmitter lasers 40 and 41 into two different wavelengths in the 1.5 $\mu$m band such that the optical interaction between the two wavelengths does not cause any distortion of the baseband and passband signals which are combined in the optical domain. Although the preferred embodiment of this invention uses a single optical receiver for both baseband and passband signals for low cost, a variant of this invention may use an integrated optical module at the receiver to separate the passband signal for detection by a separate O/E receiver or for delivery to another location with a separate fiber.

An important advantage of this system is that the optical transmitters 40 and 41 can be separately optimized for their respective signals. Such optimization eliminates a 1 to 2 dB transmitter-related optical power penalty that would be incurred if a single transmitter were used, and it improves system performance. For example, the optical path for the passband signal can include an additional erbium doped fiber amplifier 44 to optimize passband transmission.

Figure 4:
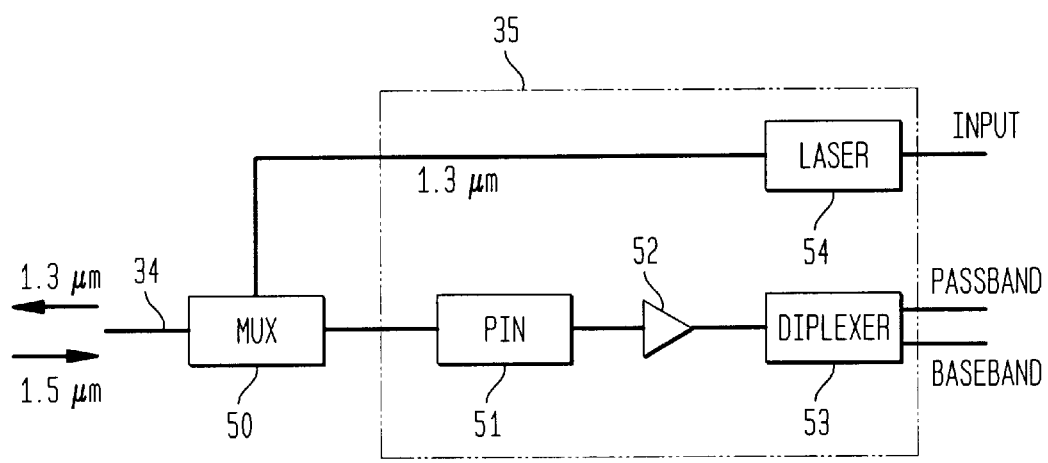
FIG. 4 is a schematic diagram of an optical transceiver for the system of FIG. 3.

FIG. 4 schematically illustrates an advantageous optical transceiving arrangement 35 for end-users. The arrangement receives the transmitted combined optical signal from a fiber 34 through a MUX 50. The combined signal is applied to a receiving element 51, such as a PIN diode, and the resulting combined electrical signal is fed into a preamplifier 52. The preamplified combined electrical signal is then split by diplexer 53 into its baseband portion and its passband portion.

To permit two-way communication with the end user, the transceiver 35 may advantageously include a transmitter laser 54 for receiving electrical signals from the users and generating an optical return signal at wavelength different from the optical input signal. This return signal is presented to the multiplexer 50 and sent back toward the central office by fiber 34. The input downstream signals are preferably at two spaced apart wavelengths in the 1.48–1.60 $\mu$m range and the output upstream signal is preferably at 1.3 $\mu$m.

The invention may now be better understood by consideration of the following specific examples and tests. In the examples and tests, which are intended for those skilled in the art, the acronyms used are expanded when they are first used and in the definitions section at the end of this specification.

The following examples are provided for the purpose of illustration only. The examples should not be construed as limiting the invention.

EXAMPLE 1

This example is to demonstrate this invention's feasibility. The experimental detail combined with the description above shows advantages of various possible components and methods.

Figure 5:
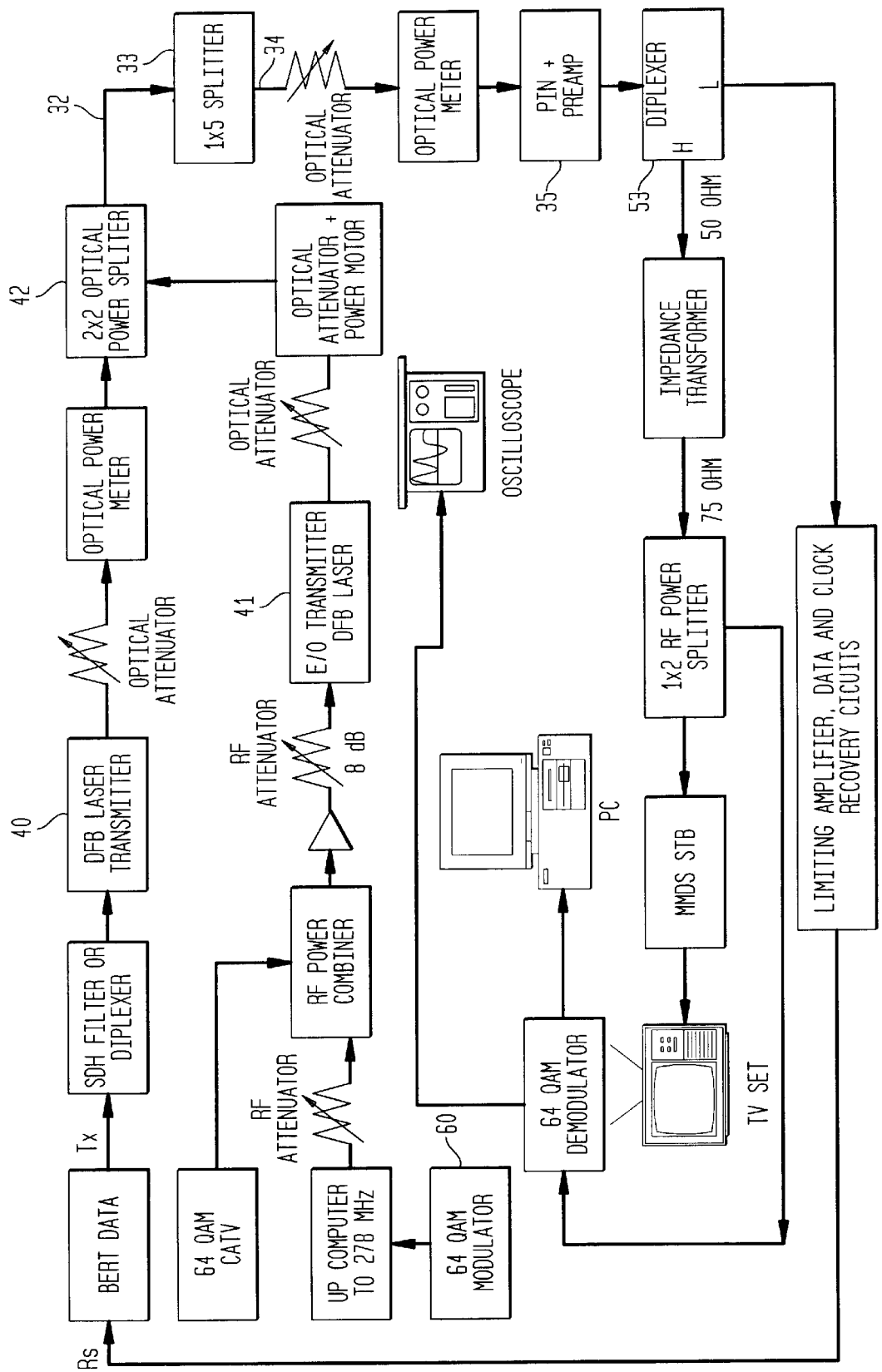
FIG. 5 is a diagram of a test system combining both baseband and passband signals.

FIG. 5 schematically illustrates the test apparatus wherein an electrical baseband modulation signal applied to a DFB laser transmitter 40 generates an optical baseband signal. An electrical 64 QAM passband signal derived from a MMDS signal is converted to an optical passband signal in a second DFB laser 41, and the baseband and passband optical signals are combined in a 2×2 optical power combiner 42, transmitted over a common fiber 32 to a power splitter 33. An arm 34 of the splitter transmits a portion of the received optical signal to an end-user receiver 35 including a diplexer 53. The receiver 34 was a Lucent Technologies 1319 O/E receiver. The receiver comprises a PIN detector and a transimpedance amplifier (TIA). A diplexer 53 is used to separate the baseband and passband signals at the output of the receiver. Electrical circuitry pertinent to the particular passband signal used and to the tests conducted (but not to the actual systems using the invention) will be described in connection with these tests.

We have used a 64-QAM MMDS video signal for the passband signal. The signal comprises 31 carriers with 4 empty slots in 222–408 MHz. Each carrier is 6 MHz wide and carries 5.063 M symbols/s. At one of the empty slots at 279 MHz, we inserted a 6 MHz wide 64-QAM test carrier for bit error rate and constellation studies from a Broadcom modulator. The power level of the test carrier was adjusted to the level of the MMDS carriers. The DAVIC scheme was used for forward error correction (FEC) as offered by the Broadcom modulator 60. For the passband signal, we used both a directly modulated DFB digital laser transmitter and a commercially available transmitter from Harmonics Lightwave that is optimized for analog signals.

Figure 6A:
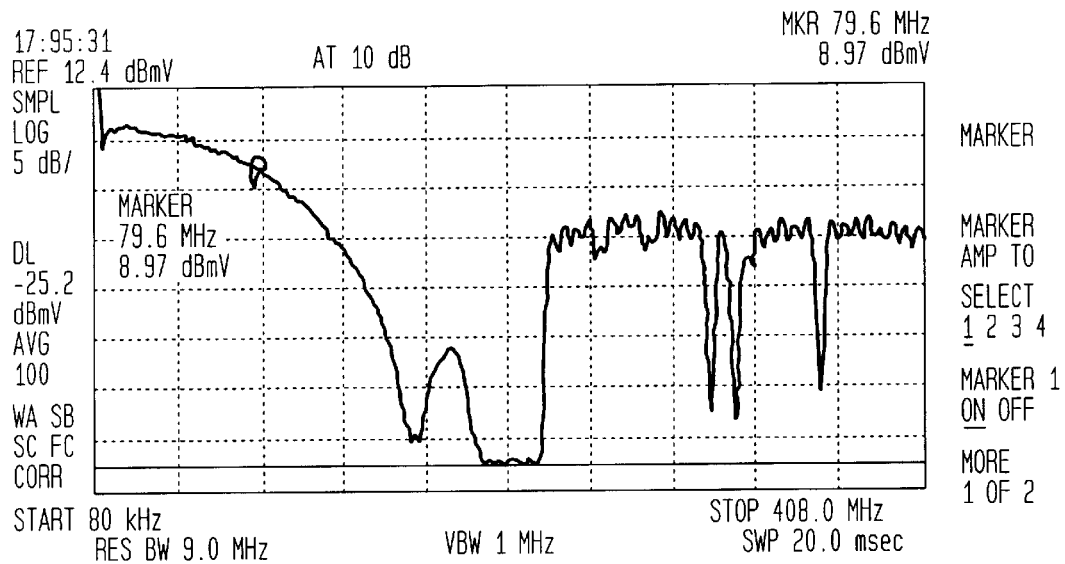
FIGS. 6–9 are graphical illustrations showing the results of tests using the system of FIG. 5.
Figure 6B:
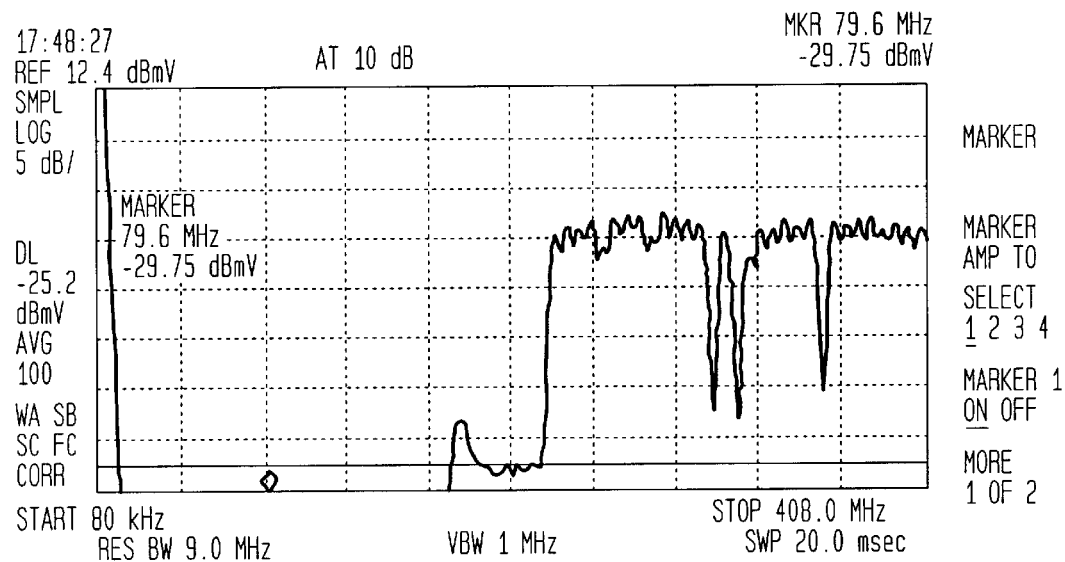
Figure 6C:
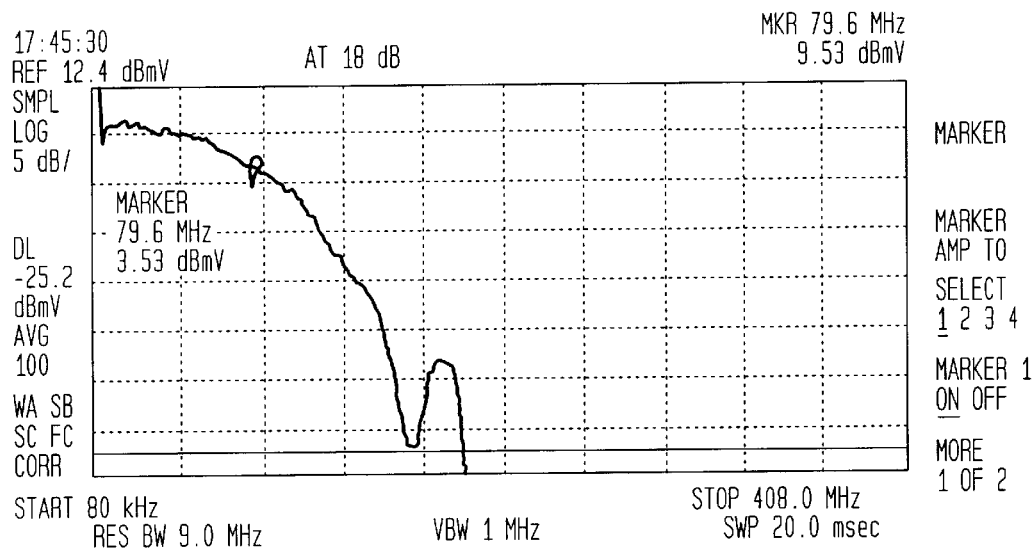

The outputs of the receiver 35 are shown in FIGS. 6(a), 6(b) and 6(c). FIG. 6(a) shows the composite signal at the output of the receiver. This composite includes both the baseband and the passband signals with a notable separation between them.

FIG. 6(b) shows the high frequency output of the diplexer comprising the MMDS digital video carriers in 222–408 MHz. This constitutes the passband signal.

FIG. 6(c) shows the low frequency output of the diplexer constituting the 155 Mbps baseband signal. The diplexer separated the baseband and passband signals with negligible insertion loss for either signal.

Figure 7:
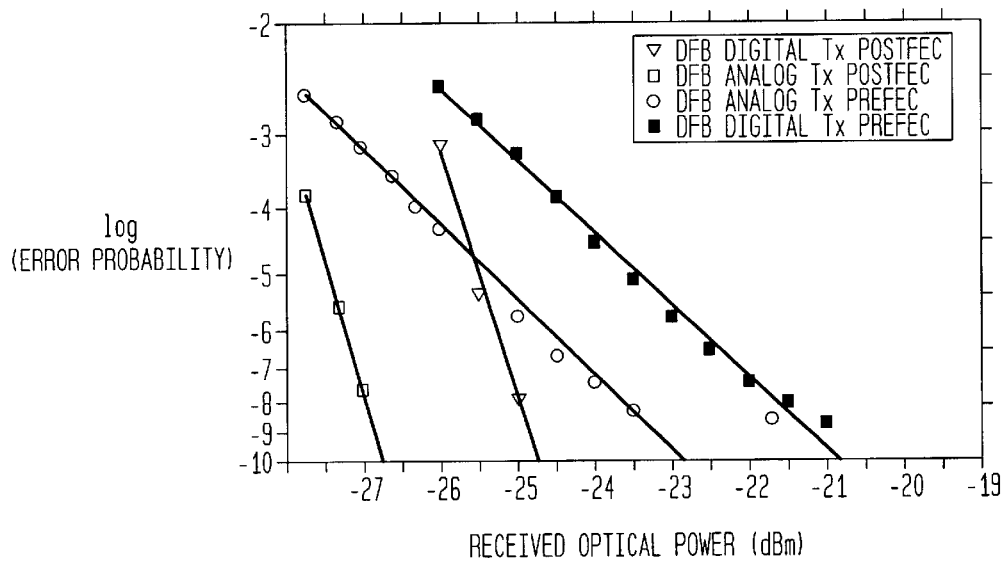

FIG. 7 compares the system performance of an analog transmitter optimized for analog signals with a digital transmitter for the passband signal. The analog transmitter was obtained as a commercial product from Harmonic Lightwave. The circuit of this transmitter had been designed for optimum analog video modulation. The digital transmitter has a DFB laser on a laser test fixture. FIG. 7 plots the bit error rate of the received signal versus the received optical power. The measurements were taken on the 279 MHz test carrier with all MMDS carriers present but without the baseband signal present. Data are shown for both digital and analog transmitters and before and after forward error correction. The forward error correction in the DAVIC scheme provides about 4 dB optical coding gain for a bit error rate of $10^{-10}$. The coding gain decreases with increasing bit error rate. The data shows that the analog transmitter gives a 2-dB optical power improvement in system performance as compared to the digital transmitter.

Qualitatively, no impairment was observed in the picture quality or sound quality of the 285 MHz channels on TV for a test channel bit error rate of less than $5 \times 10^{-3}$ before forward error correction. This corresponds to −26.5 dBm passband optical power at the receiver. After FEC, this corresponds to about $10^{-10}$ BER. It is believed that a system built for a $10^{-6}$ BER before FEC will result in an essentially error free signal after FEC. This requires about −24.5 dBm optical signal at the receiver in the absence of a baseband signal.

Figure 8A:
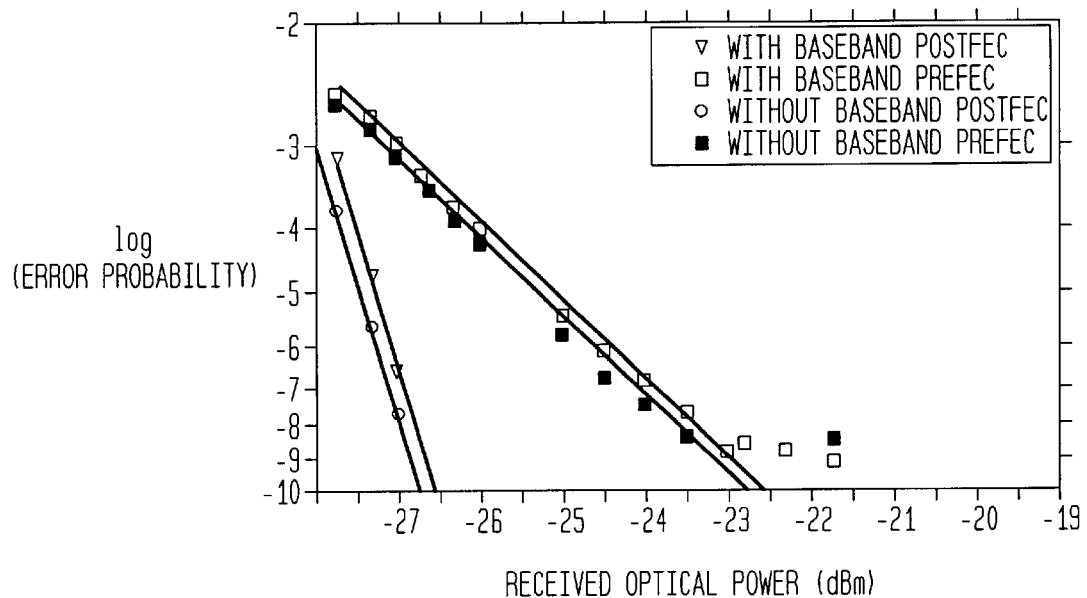
Figure 8B:
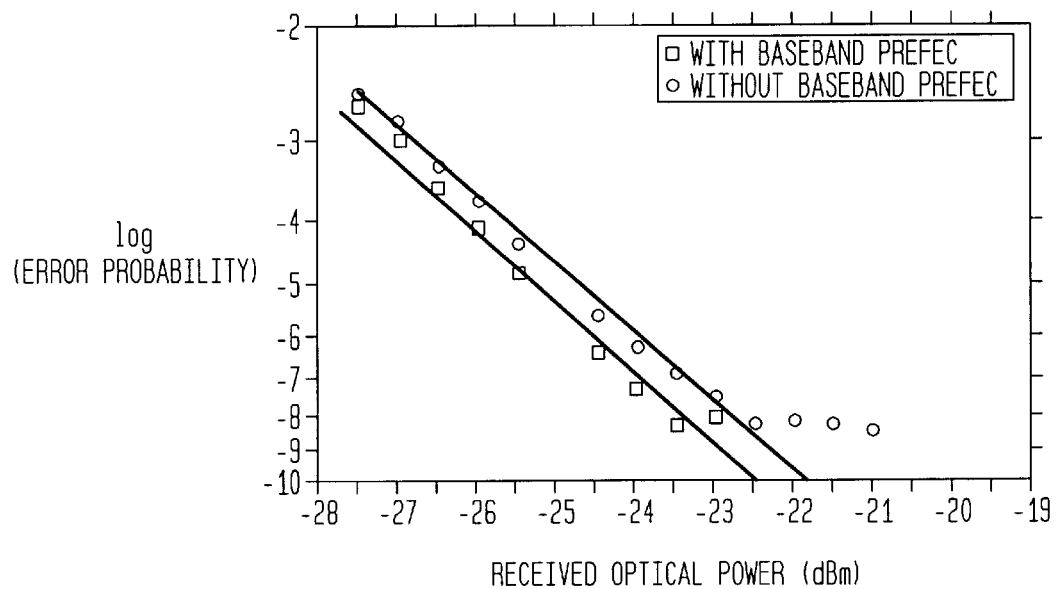
Figure 8C:
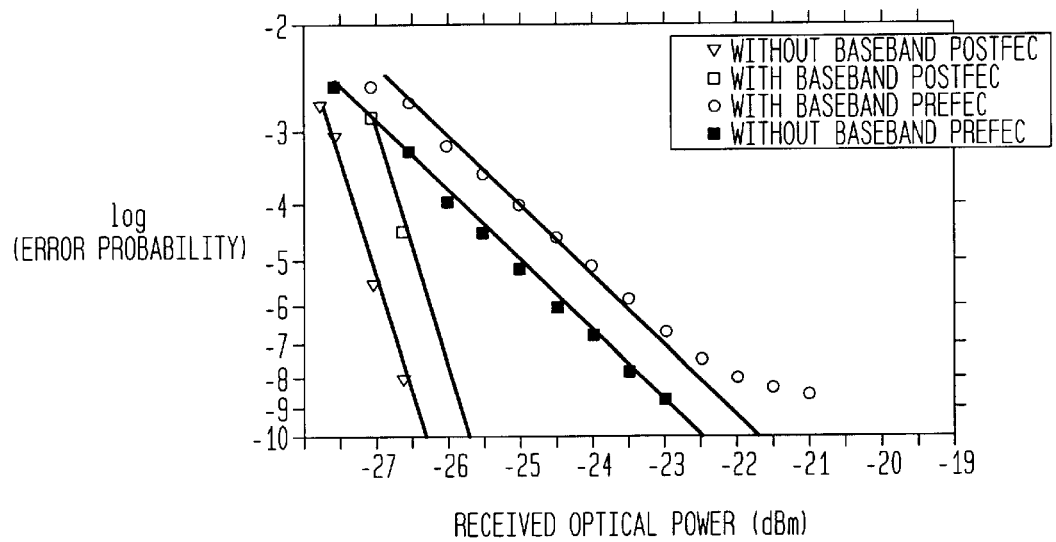

FIGS. 8(a)–8(c) plot the logarithmic error probability of the passband in the presence of respectively different baseband optical power levels. FIG. 8(a) is measured with −28 dBm of baseband optical power, FIG. 8(b) with −25 dBm and FIG. 8(c) with −22 dBm optical powers. The optical power penalty on passband due to the presence of baseband varies with the baseband power. The optical power penalty is 0.2 dB, 0.6 dB and 0.75 dBm for baseband powers of −28 dBm, −25 dBm and −22 dBm, respectively.

Figure 9:
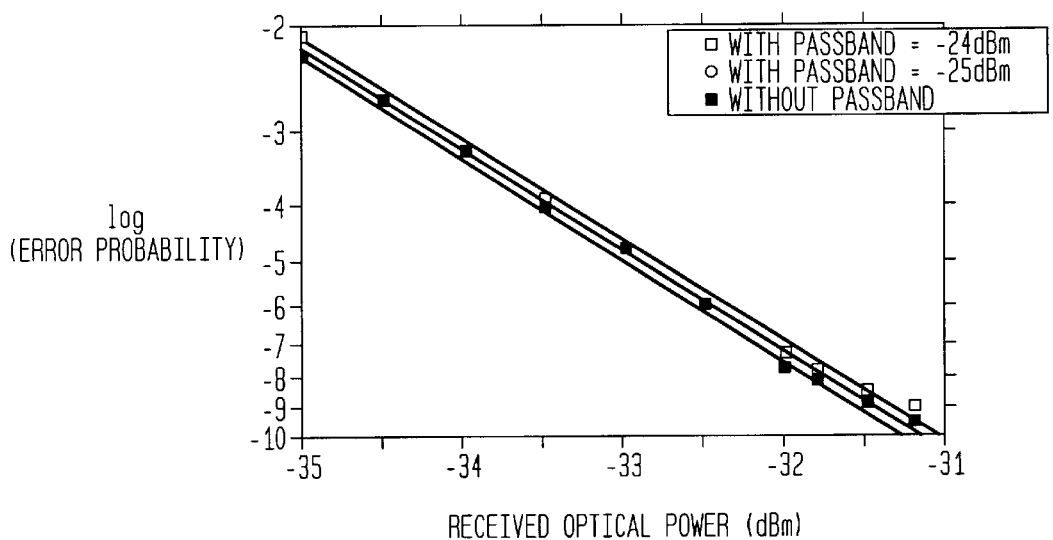

FIG. 9 shows the logarithmic error probability of the baseband with and without the presence of a passband signal at −24 dBm and −25 dBm optical power. Based on these measurements and other measurements at high passband optical power, it is believed that the presence of a passband signal at less than −11 dBm optical power adds negligible noise in the baseband region. The baseband power penalty is less than 0.5 dB.

As the baseband optical power increases beyond −22 dBm, the noise due to baseband harmonics increases in the RF range of the passband. This increases the power penalty on passband as shown in FIGS. 8(a)–8(c). Thus baseband harmonics should be minimized by filtering the baseband signal and biasing the baseband laser in a linear region. This may reduce the extinction ratio in the baseband below the FSAN required 10 dB. Nonetheless, the system can operate at less than −22 dBm for either type of signal.

These tests show that a digitally modulated passband signal can be delivered over the same optical fiber along with a baseband signal. This system can use most existing transmission equipment and baseband transmission power budgets (e.g. ITU-T G983.1). Approximately 1–5 Gbps transmission rates can be achieved compatible with existing components. This additional bandwidth can be used for broadcast and switched video and for other bandwidth demanding services. It can also be used to provide a dedicated channel of desired bandwidth to any subscriber. The proposed technique also provides a graceful upgrade of currently installed passive optical networks without incurring significant additional costs or power penalty. If some subscribers want to receive baseband data only and no video or any other passband services, the system is compatible with baseband only ONU with negligible power penalty.

It will be clear to those skilled in the art that many modifications and variations may be made to the embodiments as described without substantially departing from the spirit and scope of the present invention. It is intended that all such modifications and variations be included herein within the scope of the present invention, as is set forth in the appended claims.

DEFINITIONS

| Acronym | Meaning |
| --- | --- |
| APD | avalanche photodetector |
| BER | bit error rate |
| DAVIC | digital audio visual council |
| DSS | digital satellite service |
| EDFA | erbium doped fiber amplifier |
| FDM | frequency division multiplexing |
| FEC | forward error correction |
| FTTC | fiber to the curb |
| FTTH | fiber to the home |
| FDM | frequency division multiplexed |
| Gbps | gigabits per second |
| HDTV | high definition television |
| ITU | International Telecommunications Union |
| LNB | low noise block |
| Mbps | megabits per second |
| MMDS | multichannel multipoint distribution system |
| O/E | optical-to-electrical |
| OMD | optical modulation depth |
| OMI | optical modulation index |
| ONT | optical receiver |
| ONU | optical network unit |
| PON | passive optical network |
| QAM | quadrature amplitude modulation |
| QPSK | quadrature phase shift keying |
| RF | radio frequency |
| R-S coding | Reed-Solomon coding |
| SNR | signal-to-noise ratio |
| STB | set top boxes |
| TDM | time division multiplexing |

What is claimed:

1. An optical communication system for transmitting both baseband and passband signals on a common optical transmission path comprising:

a source of an electrical baseband signal;

a source of an electrical passband signal modulated for digital broadcast services, and the passband signal comprises high bit rate M-QAM modulation wherein $M \geq 64$;

a first optical transmitter responsive to the electrical baseband signal for generating an optical baseband signal that can be optimized in light power for combination with an optical passband signal;

a second optical transmitter responsive to the electrical passband signal for generating the optical passband signal that can be optimized in light power for combination with the optical baseband signal;

an optical combiner optically coupled to the transmitters for combining the optical baseband and passband signals into a combined optical signal;

an optical transmission path optically coupled to the combiner for transmitting the combined optical signal; and an optical receiver optically coupled to the transmission path for receiving transmitted optical signals.

2. An optical communication system according to claim 1 wherein the optical combiner comprises an optical power coupler.

3. An optical communication system according to claim 1 wherein each optical transmitter comprises a semiconductor laser.

4. An optical communication system according to claim 1 wherein the first optical transmitter comprises a digital laser.

5. An optical communication system according to claim 1 wherein the second optical transmitter is optimized for analog signals.

6. An optical communication system according to claim 1 wherein the optical receiver comprises a PIN diode.

7. An optical communication system according to claim 1 wherein the optical receiver comprises an avalanche photo-detector (APD).

8. An optical communication system according to claim 1 wherein the optical transmission path comprises an optical fiber.

9. An optical communication system according to claim 1 further comprising an erbium doped optical fiber optically coupled to the second optical transmitter.

10. An optical communication system according to claim 1 wherein the optical receiver receives both the baseband and the passband signals.

11. An optical communication system according to claim 1 to communicate with a user wherein the optical signals comprise a wavelength range in a first band used to transmit information to the user, and an additional wavelength to receive information from the user.

12. An optical communication system according to claim 1 wherein the first band is from about 1.48 $\mu$m to about 1.60 $\mu$m, and the additional wavelength is about 1.3 $\mu$m.

13. An optical communication system for transmitting both baseband and passband signals on a common optical transmission path comprising:
- a source of an electrical baseband signal;
- a source of an electrical passband signal modulated for digital broadcast services, and the passband signal comprises high bit rate M-QAM modulation wherein M≧64;
- a first optical transmitter at a first wavelength responsive to the electrical baseband signal for generating an optical baseband signal that can be optimized in light power for combination with an optical passband signal;
- a second optical transmitter at a second wavelength responsive to the electrical passband signal for generating the optical passband signal that can be optimized in light power for combination with the optical baseband signal;
- an optical combiner optically coupled to the transmitters for combining the optical baseband and passband signals into a combined optical signal;
- an optical transmission path optically coupled to the combiner for transmitting the combined optical signal; and
- an optical receiver optically coupled to the transmission path for receiving transmitted optical signals.

14. An optical communication system according to claim 13 wherein the optical combiner comprises an optical power coupler.

15. An optical communication system according to claim 13 wherein each optical transmitter comprises a semiconductor laser.

16. An optical communication system according to claim 13 wherein the first optical transmitter comprises a digital laser.

17. An optical communication system according to claim 13 wherein the second optical transmitter is optimized for analog signals.

18. An optical communication system according to claim 13 wherein the optical receiver comprises a PIN diode.

19. An optical communication system according to claim 13 wherein the optical receiver comprises an avalanche photodetector (APD).

20. An optical communication system according to claim 13 wherein the optical transmission path comprises an optical fiber.

21. An optical communication system according to claim 13 further comprising an erbium doped optical fiber optically coupled to the second optical transmitter.

22. An optical communication system according to claim 13 wherein the optical receiver receives both the baseband and the passband signals.

23. An optical communication system according to claim 13 to communicate with a user wherein the optical signals comprise a wavelength range in a first band used to transmit information to the user, and an additional wavelength to receive information from the user.

24. An optical communication system according to claim 13 wherein the first band is from about 1.48 $\mu$m to about 1.60 $\mu$m, and the additional wavelength is about 1.3 $\mu$m.

* * * * *